(No Model.) 2 Sheets—Sheet 1.
E. W. RICE, Jr.
LIGHTNING ARRESTER.
No. 440,654. Patented Nov. 18, 1890.
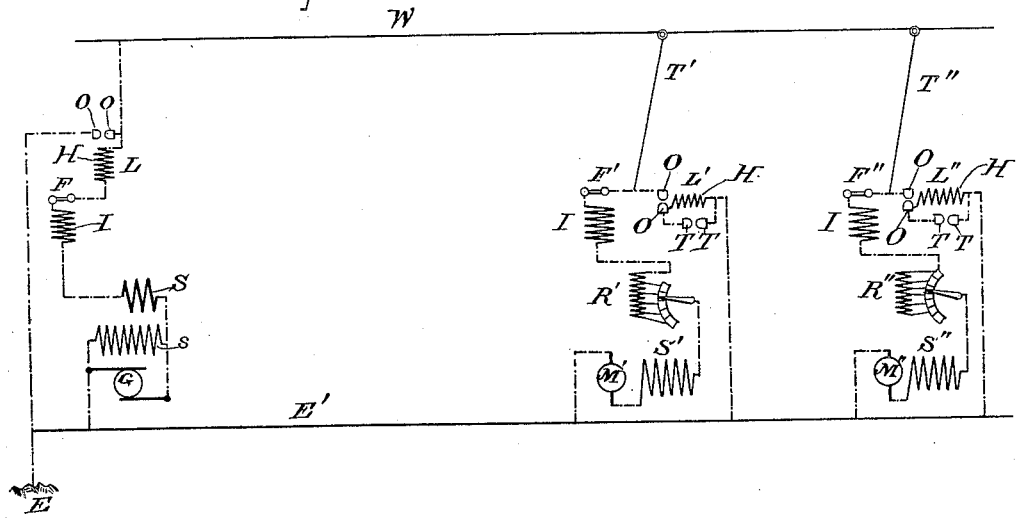
Fig. 1.
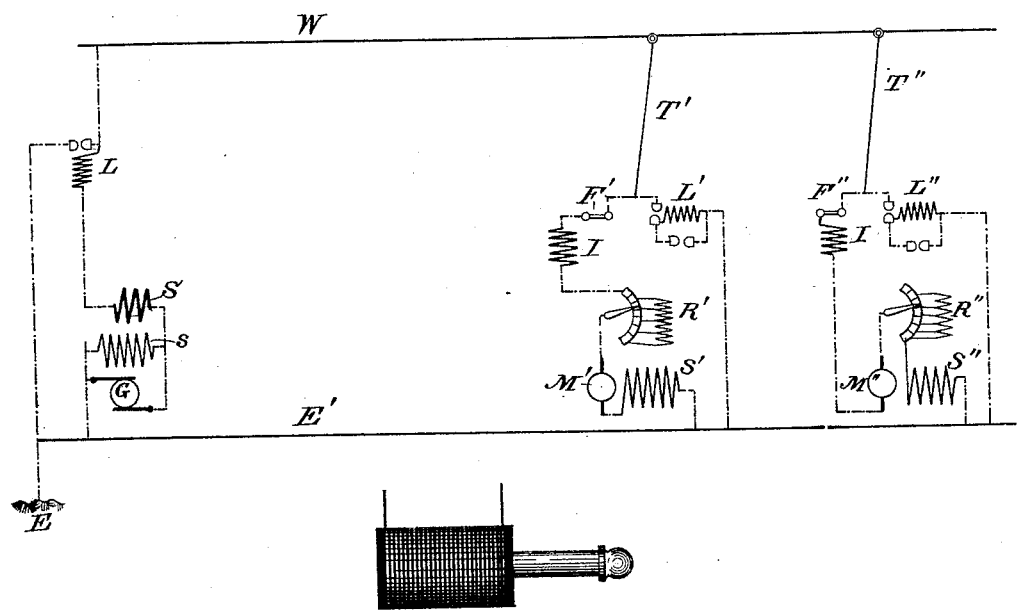
Fig. 2.
Fig. 6.
ATTEST:
INVENTOR:
Edwin Wilbur Rice, Jr.
By H. C. Townsend,
Attorney (No Model.) 2 Sheets—Sheet 2.
E. W. RICE, Jr.
LIGHTNING ARRESTER.
No. 440,654. Patented Nov. 18, 1890.
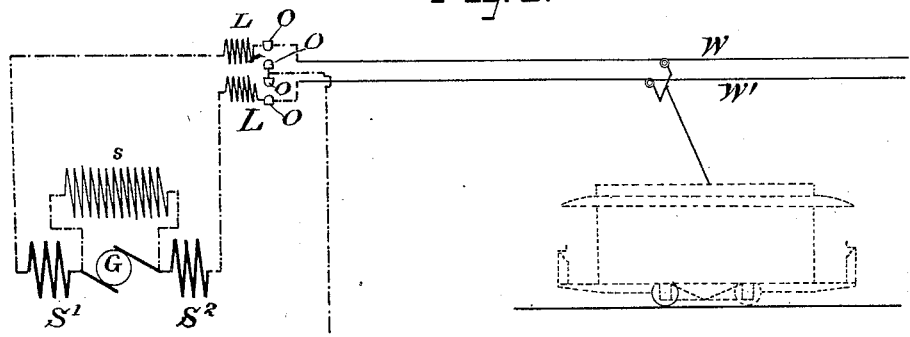
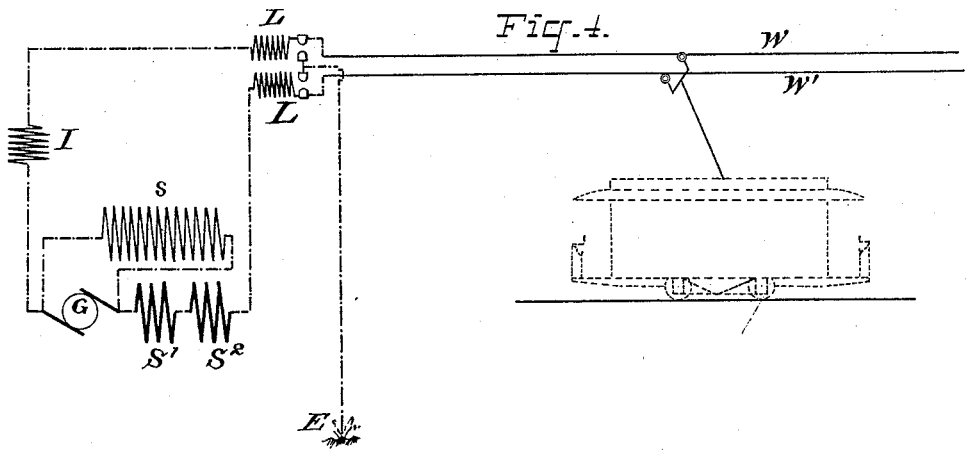
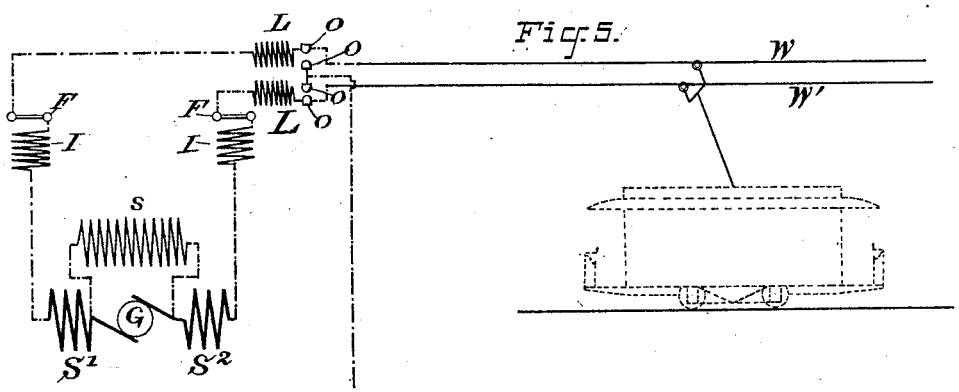
ATTEST:
INVENTOR:
Edwin Wilbur Rice, Jr.
By H. C. Townsend
Attorney

UNITED STATES PATENT OFFICE.

EDWIN WILBUR RICE, JR., OF LYNN, MASSACHUSETTS.

LIGHTNING-ARRESTER.

SPECIFICATION forming part of Letters Patent No. 440,654, dated November 18, 1890.

Application filed August 15, 1889. Serial No. 320,904. (No model.)

*To all whom it may concern:*

Be it known that I, EDWIN WILBUR RICE, Jr., a citizen of the United States, and a resident of Lynn, in the county of Essex and State of Massachusetts, have invented certain new and useful Systems of Electric-Power Distribution, of which the following is a specification.

My present invention relates to arrangements of circuits and apparatus having for their object the protection of electric apparatus from damage by lightning or atmospheric discharges of electricity, which discharges, if not sufficient in themselves to materially injure the apparatus, often provoke a path for the current generated by the apparatus or flowing therethrough which then burns out the insulation or causes other trouble.

My invention is especially applicable to systems of electric-power distribution and for use with the dynamo-machines and motors employed in such systems, although the invention may likewise be used with any other electrical apparatus placed on circuits where there is liability to damage by lightning.

My invention consists in a new and novel disposition of the parts of the electrical apparatus whereby a statical charge of electricity finds escape from cloud to earth or from earth to cloud around the generator or motor or other apparatus through a circuit which has a much lower self-induction than the circuit through the fields and armature of the generator or motor.

My invention consists, also, in the application of a self-inductive coil into the branch or connection containing the apparatus to be protected, as will be hereinafter more fully described and shown.

My invention likewise consists in the application of a safety-fuse and arc-rupturing magnet therefor placed in the circuit containing the apparatus to be protected and at a point such that the self-induction of the coil of the arc-rupturing magnet shall tend to shunt the lightning-discharge over the electrodes of the lightning-arrester.

My invention further consists in providing auxiliary induction devices to be placed upon one or both sides of the electrical apparatus to be protected.

My invention is particularly applicable to electric railways where the motor on the car is connected between the overhead line and the track which is used for the return-circuit; but it is also applicable where both outgoing and return wires are overhead, and even to the case of conduits.

I have represented the arrangement of the electrical apparatus of my invention diagrammatically in the figures accompanying this description.

Figures 1 and 2 illustrate my invention as applied to a single-wire overhead system of electric railway. Figs. 3, 4, and 5 show the same applied to a double overhead system of electric railway or one in which the track forms no part of the electrical circuit. Fig. 6 shows a detail of the apparatus.

In Fig. 1, G is the armature of a compound wound dynamo-generator, of which $s$ represents the shunt and S the series winding of the field-magnet.

W is the overhead or trolley line, and E' the track-return.

L is a lightning-arrester of any good form, whose electrodes are separated by a space so small as not to offer much resistance to a high-potential atmospheric discharge, or to a charge of high potential induced by an atmospheric discharge.

O O indicate the electrodes of the lightning-arrester, placed, as shown, in a branch leading from the general circuit to earth. The contacts or electrodes of the lightning-arrester are preferably placed as near to earth as possible, so that the self-induction of the earth-connection through the same may be as small as possible in amount.

H indicates the coil of an arc-rupturing magnet, applied so as to rupture any arc forming across the electrodes O O, after the manner described in patent to Elihu Thomson, No. 321,464.

I indicates a self-inductive or reactive coil placed in the connection or circuit including the dynamo-machine. This coil may be of any construction, and is made, as well understood in the art, so that the self-induction of the current in the coils shall tend to oppose the passage of a sudden current through them. I make the self-induction of the coil adjustable in any desired way, as well understood in the art—as, for instance, by adjustment of the core for the same, as shown in Fig. 6. The self-inductive coil I opposes a large self-inductive resistance in the circuit of the generator to the passage of a lightning-stroke or high-tension current over the connection including such generator, and thereby tends to force any lightning-stroke to take the path of lower resistance across the electrodes O O.

F indicates a safety-fuse in the connection to the dynamo. To this fuse I apply the self-inductive coil I in such manner that it shall operate as an arc-rupturing device, after the manner described in the patent to Elihu Thomson, No. 401,608.

The coil H of the lightning-arrester, being included in the circuit through the coil I and field S, will assist in diverting the lightning-stroke or high potential discharge from the generator or other apparatus.

M' represents the armature of an electric motor, connected between the lines W and E' by the trolley T', an adjustable rheostat R', and magnet-field S' of the motor. An open-circuit branch line to the track E' is also provided about the motor, which branch includes a lightning-arrester L'. In the connection to the motor I also include the self-inductive coil I, and preferably in addition a fuse F', upon which the magnetism of said coil acts in the manner already explained. The contacts of the lightning-arrester L' for the motor are indicated at O O and the arc-disrupting coil at H.

It will be observed that the arc-rupturing magnet-coil for the lightning-arrester, in the case of the motor, is included in the branch containing the electrodes O O.

In order that there may be as little resistance as possible to the high-potential discharge around the motor, I eliminate the self-induction of the coil H, in this instance, by the provision of supplemental electrodes T T in a branch around them, which electrodes are separated by a very small space, like electrodes O O, and while possessing a large ohmic resistance do not oppose the passage of the high-potential discharge to the same extent as the coils H. The coils H, however, will shunt any current which may tend to flow across electrodes T T, so as to maintain an arc thereat after passage of a high-potential discharge, and the magnetism developed by such coil H will rupture the arc flowing or tending to flow across the electrodes O O.

By the provision of the devices already described, applied, and connected, as shown, the lightning-discharge on the line seeking earth has several paths offered it, one through the generator, one through the motor M, and its counterpart as many as may be in operation upon the line and other paths through the lightning-arrester circuits in multiple with this apparatus. The path to earth E' through the lightning-arresters L L' L" has a high-ohmic resistance, but a very low self-inductive resistance, whereas the circuit through the generator and motor has a very high self-inductive resistance. This self-inductive resistance is controlled to any desired extent by self-inductive coil I, whose winding or disposition of material may be varied to change the self-induction, as before explained. An atmospheric discharge or discharge induced by an atmospheric discharge has an exceedingly high potential, so that its rate of flow is enormous and attended by great self-induction. Consequently it will not divide itself through the multiple paths to earth in accordance with the ohmic resistance, but more proportionally to the self-inductive resistance, which latter, in the case of the circuit through the lightning-arresters, is exceedingly small, and in the case of the generator and motor circuits very great, and the charge is therefore diverted from the generator and motor circuits through the lightning-arresters to earth. Any arc formed by the generator-current is dissipated and destroyed in the well-known manner.

The armature-field and adjustable resistance of a second motor, similar to that described, are indicated by the letters M" S" R", respectively. T" indicates the trolley for such motor; F", the fuse, similar to that described, and L" the lightning-arrester.

The self-inductive coil I, applied in connection with the motor, acts also as a retarding device to prevent a great rush or impulse of current flowing through the motor when starting from a state of rest, at which time its counter-electro-motive force is *nil*, or very small. It also acts in the same way to smooth out fluctuations of current occurring during the travel of the vehicle and caused by irregularities of the track or variations of contact on the power-wire W.

Fig. 2 of the drawings is the same as Fig. 1, with the exception that the self-inductive coil I and fuse F are omitted from the connection, including the generator. The lightning-arresters L', L", &c., may be of any good form, although I prefer that they belong to that class in which the arc is destroyed by a magnet, the latter only being energized simultaneously with the existence of the arc across the electrodes or arrester-plates, so that the self-induction of the circuit may be kept small.

In Fig. 3 the armature of the generator G is shown protected from atmospheric discharges by being placed between the series windings S' S$^2$ on the two field-magnets of the dynamo or motor, as shown, and two lightning-arresters constantly in circuit—one on each side—have their rupturing-magnet coils applied in a manner to add their self-inductive resistance to the generator-circuit, so that the static discharge is forced to earth E. While this arrangement is quite effective, I prefer, in order to insure the safety of the armature, to put a self-inductive coil in circuit, as indicated in Figs. 4 and 5.

In Fig. 4 the series coils are both placed on the same side of the armature and the inductive coil I on the other side, and in Fig. 5 a modified arrangement is shown, the series field coils S' S'' being supplemented by two self-inductive coils I I'. The coils I, I', &c., may, as before stated, have the double function of self-inductive coils for protection against lightning discharges and magnetic cut-outs. Lightning-arresters, similar to L, Fig. 1, may be provided for the motors upon such a circuit.

In Figs. 1 and 2 the field coils S' S'' are connected, first, in the series between W and E' for the following reason: The motor-frame and field-magnets are connected to earth through the axles and wheels of the vehicle. A discharge from cloud to earth, or vice versa, must therefore meet the self-induction of the field-magnets, and is thereby diverted to the lightning-arrester circuit, whereas if the armature were connected between the field S' and the point of connection of the arrester the static discharge would tend to leap from the motor-frame or field-magnet cores to the armature, or vice veasa, so as to avoid the self-induction of the field-magnets, the condition then more nearly approaching the condition of inductive resistance through the lightning-arrester circuit.

What I claim as my invention is—

1. The combination, with the electric apparatus to be protected, of a lightning-arrester in a branch to earth of low self-induction, and a self-inductive coil interposed between the said apparatus and the point of connection of the lightning-arrester.

2. The combination, with the lightning-arrester in the branch, of an adjustable self-inductive coil in circuit between the point of connection of the lightning-arrester and the apparatus to be protected.

3. The combination, with a lightning-arrester applied to the circuit containing the apparatus to be protected, of a safety-fuse and an arc-rupturing magnet constituting a self-inductive resistance and placed in the circuit containing said apparatus between the point of application of the lightning-arrester and the earth or return circuit for the apparatus.

4. The combination, with an electric motor placed in an earth-connection from a supply-wire W, of field-coils for said motor placed first in the circuit leading from such wire to the motor and thence to earth and constituting a reactive device, and a branch from such circuit containing the lightning-arrester attached to the circuit at a point between the supply-wire and the field-magnet coil.

5. The combination, with double wires, of lightning-arresters connected to both wires, and a dynamo machine or motor in the connection between the wires, with its armature interposed between field-coils constituting a reactive device and included, respectively, in the connections from such armature to the points of connection of the lightning-arrester.

6. The combination, with the double wire or circuit, of the dynamo machine and motor or other apparatus in the connection between them, lightning-arrester contacts in branches from each wire to earth, and arc-rupturing magnet-coils in the connections, respectively, from the points of application of the lightning-arrester to the opposite poles of the dynamo-machine or other apparatus to be protected.

7. The combination, with the double wire or circuit having apparatus in a connection between them, of a lightning-arrester for each wire, and a self-inductive coil in the connection from each point of application of the lightning-arrester to the apparatus to be protected.

8. The combination, with an electric-railway motor, of a self-inductive coil in the connection to the same, and a branch to earth around said coil and motor containing lightning-arrester electrodes.

9. The combination, with the apparatus to be protected, of a self-inductive or reactive coil in the circuit with the same, and a ground branch of low self-induction around both the coil and the apparatus.

Signed at New York, in the county of New York and State of New York, this 7th day of August, A. D., 1889.

EDWIN WILBUR RICE, JR.

Witnesses:
H. C. TOWNSEND,
THOS. F. CONREY.